United States Patent [19]
Miyabara et al.

[11] Patent Number: 5,567,502
[45] Date of Patent: Oct. 22, 1996

[54] MAGNETIC RECORDING MEDIUM HAVING A MAGNETIC LAYER CONTAINING ABRASIVE PARTICLES

[75] Inventors: Hiroyuki Miyabara; Shigeharu Watase, both of Saku; Yoshio Kawakami, Nagano-ken; Kiyoto Fukushima, Saku, all of Japan

[73] Assignee: TDK Corporation, Tokyo, Japan

[21] Appl. No.: 405,192

[22] Filed: Mar. 16, 1995

[30] Foreign Application Priority Data

Mar. 31, 1994 [JP] Japan ..................................... 6-083655

[51] Int. Cl.$^6$ ................................................. G11B 05/708
[52] U.S. Cl. ........................... 428/141; 428/323; 428/328; 428/329; 428/336; 428/694 BM; 428/694 BS; 428/694 SL; 428/694 BN; 428/900
[58] Field of Search ..................................... 428/141, 323, 428/328, 329, 336, 694 BM, 694 BS, 694 SL, 694 BN, 900

[56] References Cited

U.S. PATENT DOCUMENTS

| | | | |
|---|---|---|---|
| 4,451,532 | 5/1984 | De Palma et al. | 428/336 |
| 4,687,700 | 8/1987 | Hensel et al. | 428/213 |
| 4,721,646 | 1/1988 | Iechika et al. | 428/143 |
| 5,035,948 | 7/1991 | Saito et al. | 428/329 |
| 5,132,158 | 7/1992 | Muta | 428/143 |

FOREIGN PATENT DOCUMENTS

| | | |
|---|---|---|
| 0462570 | 12/1991 | European Pat. Off. . |
| 0548880 | 6/1993 | European Pat. Off. . |
| 3930019 | 3/1990 | Germany . |
| 4212656 | 10/1992 | Germany . |

OTHER PUBLICATIONS

Japan Patent Abstract, No. 56–94522, Magnetic Recording Medium, Jul. 31, 1981 Yasuyuki Yamada.
Japan Patent Abstract, No. 57–179945, Magnetic Recording Medium, Nov. 5, 1982, Nobutaka Yamaguchi.
Japan Patent Abstract, No. 1–106331, Magnetic Recording Medium and its Production, Apr. 24, 1989, Shinji Saito.
Japan Patent Abstract, No. 2–73515, Tape Shaped Magnetic Recording Medium, Mar. 13, 1990, Kunihiko Muta.
Japan Patent Abstract, No. 3–99848, Biaxially Oriented Thermoplastic Resin Film for Magnetic Tape Base, Koichi Abe.

*Primary Examiner*—Stevan A. Resan
*Attorney, Agent, or Firm*—Oblon, Spivak, McClelland, Maier & Neustadt, P.C.

[57] ABSTRACT

Disclosed is a magnetic recording medium comprising a nonmagnetic support and a paint film layer which is provided on the support and has a lamination structure consisting of two or more layers, wherein the top surface magneticlayer of the layers constituting the paint film layer contains abrasive particles having a Mohs hardness of not less than 6 in an amount of 3 to 16 parts by weight based on 100 parts by weight of a ferromagnetic powder and has a thickness of not more than 0.5 μm, a ratio of a mean particle diameter of the abrasive particles to the thickness of the top surface magnetic layer is in the range of 1.0 to 1.8, and a content of the abrasive particles each having a size larger than the thickness of the top surface magnetic layer in the particle size distribution of the abrasive particles is in the range of 50 to 90% by weight. The magnetic recording medium having such constitution is excellent in running endurance and running properties and shows high electromagnetic conversion characteristics.

18 Claims, 1 Drawing Sheet

MAGNETIC RECORDING MEDIUM HAVING A MAGNETIC LAYER CONTAINING ABRASIVE PARTICLES

BACKGROUND OF THE INVENTION

The present invention relates to a magnetic recording medium which is excellent in running durability and running properties and shows high electromagnetic properties.

With demands for long time running, compact size, high density and high performance, magnetic recording media such as audio tapes and video tapes have been required to realize high electromagnetic properties. For example, according as video tape recorders are widely used, magnetic recording media of much higher running durability are desired, because it is thought that magnetic heads of the video tape recorders available in the beginning are too much abraded owing to repeated uses for a long period of time and troubles relating to the running durability such as head clogging easily take place.

According as the surface of the magnetic layer of the magnetic recording medium is made smoother, the electromagnetic properties of the medium becomes higher, but the friction coefficient of the magnetic layer in the running procedure becomes larger, and the running durability is lowered.

It is known that an abrasive having a Mohs hardness of not less than 6 is included in the magnetic layer, as described in Japanese Patent Publication No. 21048/1990 (Japanese Patent Laid-Open Publication No. 94522/1981) and Japanese Patent Publication No. 53687/1991 (Japanese Patent Laid-Open Publication No. 179945/1982). If the particle size of the abrasive to be included in the magnetic layer is enlarged, the durability of the magnetic recording medium is generally improved, but on the other side, surface properties of the magnetic layer are deteriorated thereby to lower the electromagnetic properties.

Under the circumstances, there has been proposed a magnetic recording medium having such a constitution that the magnetic layer consists of two layers of an upper layer and a lower layer, an abrasive having a Mohs hardness of not less than 6 is contained in only the upper layer, and the mean particle diameter of the abrasive is not larger than the thickness of the upper layer, as described in Japanese Patent Laid-Open Publication No. 106331/1989.

In this magnetic recording medium, lowering of the electromagnetic properties caused by adding the abrasive having a Mohs hardness of not less than 6 to the magnetic layer is prevented to a certain degree, but the running durability is still insufficient, and especially when a video tape recorder is used for a long period of time as mentioned above, troubles relating to the running durability easily take place.

SUMMARY OF THE INVENTION

It is an object of the present invention to provide a magnetic recording medium which is superior to conventional magnetic recording media in the running durability and the running properties, particularly which exhibits stable running durability and running properties even if the magnetic head is abraded by a long time use and which shows high electromagnetic properties.

The magnetic recording medium of the present invention is, therefore, a magnetic recording medium comprising a nonmagnetic support having thereon a paint film layer including a magnetic layer, wherein the paint film layer has a lamination structure consisting of two or more layers, a top surface layer of the layers constituting the paint film layer is the magnetic layer, the top surface magnetic layer contains abrasive particles having a Mohs hardness of not less than 6 in an amount of 3 to 16 parts by weight based on 100 parts by weight of a ferromagnetic powder and has a thickness of not more than 0.5 μm, a ratio of a mean particle diameter of the abrasive particles to the thickness of the top surface magnetic layer is in the range of 1.0 to 1.8, and a content of the abrasive particles each having a size larger than the thickness of the top surface magnetic layer in the particle size distribution of the abrasive particles is in the range of 50 to 90% by weight. The magnetic recording medium having such constitution can be enhanced in the running durability and the running properties with keeping the electromagnetic properties on a high level.

In the present invention, further, the nonmagnetic support may be a film containing as its major component a thermoplastic polymer which contains as inert particles at least inert particles having such basicity as capable of adsorbing a basic indicator bromothymol blue with a blue color. The magnetic recording medium having such constitution can be prevented from scratches of the nonmagnetic support caused by addition of the abrasive particles.

In the present invention, furthermore, the nonmagnetic support may be a biaxially oriented lamination film having a film A containing as its major component a thermoplastic polymer which contains as inert particles at least inert particles having such basicity as capable of adsorbing a basic indicator bromothymol blue with a blue color on at least one surface of a film B containing as its major component a thermoplastic polymer, and in this case, the film A is present on the surface side of the nonmagnetic support where the paint film layer is not formed. The magnetic recording medium having such constitution can be prevented from scratches of the nonmagnetic support and can be improved in the electromagnetic properties.

In the invention mentioned above, when the thickness of the top surface magnetic layer for constituting the paint film layer of multi-layer structure, the amount and the mean particle diameter of the abrasive particles having a Mohs hardness of not less than 6 contained in the magnetic layer and the content of the abrasive particles each having larger diameter than the thickness of the top surface magnetic layer are all set within specific ranges, the magnetic recording medium can be enhanced in the running durability and the running properties with keeping the electromagnetic properties on a high level. That is, there can be obtained a magnetic recording medium which shows excellent running durability and running properties even if the magnetic head is too much abraded owing to a long time use and has high electromagnetic properties.

DESCRIPTION OF PREFERRED EMBODIMENTS

All the running endurance, the running properties and the electromagnetic properties of the magnetic recording medium cannot be satisfied at the same time, even if the magnetic layer is made to have a two-layer structure and an abrasive having a mean particle diameter of small value is included in only the tipper layer. However, if the thickness of the top stirface magnetic layer for constituting the print film layer of multi-layer structure, the amount and the mean particle diameter of the abrasive particles having a Mohs hardness of not less than 6 contained in the magnetic layer and the content of the abrasive particles having larger diameter than the thickness of the top surface magnetic layer are set within specific ranges, lowering of the electromagnetic properties can be almost all prevented and the running durability and running properties can be enhanced.

Figure 1:
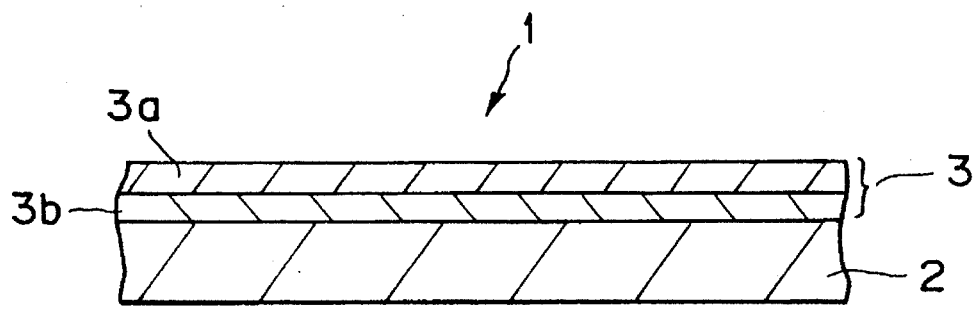
FIG. 1 is a schematic sectional view illustrating an embodiment of the magnetic recording medium according to the present invention.
Figure 2:
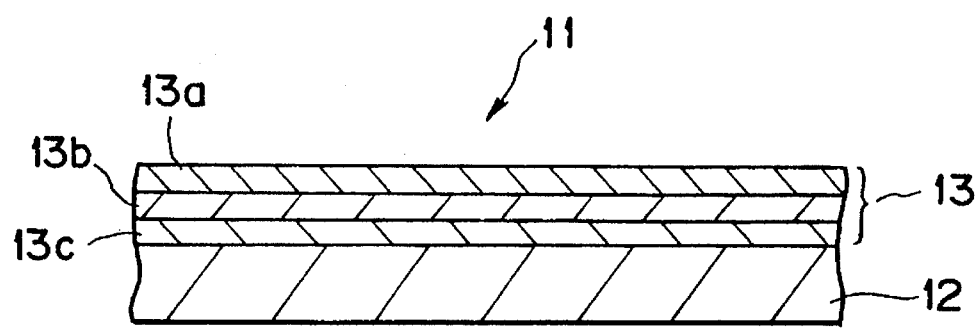
FIG. 2 is a schematic sectional view illustrating another embodiment of the magnetic recording medium according to the present invention.

The magnetic recording medium of the invention has a paint film layer having a lamination structure of two or more layers on a nonmagnetic support. In the paint film layer, the lower layer other than the top surface magnetic layer is made up of single layer or two or more layers and may be a magnetic layer or a nonmagnetic layer. FIG. 1 is a schematic sectional view illustrating an embodiment of the magnetic recording medium according to the invention. In FIG. 1, the magnetic recording medium 1 comprises a nonmagnetic support 2 and a paint film layer 3 provided thereon, and the paint film layer 3 has two-layer structure consisting of a top surface magnetic layer 3a and a lower layer 3b. FIG. 2 is a schematic sectional view illustrating another embodiment of the magnetic recording medium according to the invention. In FIG. 2, the magnetic recording medium 11 comprises a nonmagnetic support 12 and a paint film layer 13 provided thereon, and the paint film layer 13 has a three-layer structure consisting of a top surface magnetic layer 13a and lower layers 13b, 13c. In this invention, the lower layers (3b, 13b, 13c) all may be magnetic layers, or may include a magnetic layer and a nonmagnetic layer, or all may be nonmagnetic layers. However, when a nonmagnetic layer is provided, only the lowest layer (3b, 13c) may preferrably be a nonmagnetic layer. In the magnetic recording medium of the invention, further, an undercoat layer is provided if necessary on the surface of the nonmagnetic support, for the purpose of enhancing adhesion between the nonmagnetic support and the lower magnetic layer or the nonmagnetic layer of the paint film layer. In the invention, furthermore, a back coat layer is provided if necessary on the opposite surface of the nonmagnetic support to the surface where the magnetic layer is formed.

The paint film layer for constituting the magnetic recording medium of the invention has a lamination structure of two or more layers as stated above, and the top surface magnetic layer (3a, 13a) has a thickness of not more than 0.5 µm, preferably 0.3 to 0.5 µm. If the thickness of the top surface magnetic layer exceeds 0.5 µm, the running durability effect of the invention cannot be obtained.

The top surface magnetic layer (3a, 13a) contains abrasive particles having a Mohs hardness of not less than 6 in an amount of 3 to 16 parts by weight, preferably 4 to 12 parts by weight, based on 100 parts by weight of a ferromagnetic powder. If the amount of the abrasive particles is less than 3 parts by weight, the abrasion ability of the top surface magnetic layer is too small, and hence the head cleaning effect is insufficiently exerted and the running property effect of the invention cannot be obtained. On the other hand, if the amount of the abrasive particles exceeds 16 parts by weight, the electromagnetic properties tend to be deteriorated. In addition, the magnetic head is more abraded than needed (that is, too much head abrasion takes place), and hence dust or other substances easily attach to the magnetic head.

In the invention, a ratio of a mean particle diameter (D) of the abrasive particles to a thickness (T) of the top surface magnetic layer (3a, 13a), (D/T), is in the range of 1.0 to 1.8, preferably 1.2 to 1.6. If the ratio (D/T) is less than 1.0, the abrasion ability of the magnetic layer is too small, and hence the head cleaning effect is insufficiently exerted and dust or other substances easily attach to the magnetic head. If the ratio (D/T) exceeds 1.8, surface properties of the magnetic layer are deteriorated thereby to lower the electromagnetic properties.

In the particle size distribution of the abrasive particles contained in the top surface magnetic layer (3a, 13a), the amount of the abrasive particles each having a size larger than the thickness of the top surface magnetic layer is in the range of 50 to 90% by weight, preferably 60 to 85% by weight, based on the total weight of all the abrasive particles. Thereby, the running durability and the running properties can be enhanced, while reduction of the electromagnetic properties is almost all prevented. If the amount thereof is less than 50% by weight, though the surface properties of the magnetic layer becomes better and the electromagnetic properties are improved, the abrasion ability of the top surface magnetic layer becomes too small, and hence the head cleaning effect is insufficiently exerted and dust or other substances easily attach to the magnetic head, resulting in insufficient running durability. On the other hand, if the amount thereof exceeds 90% by weight, the surface properties of the magnetic layer are deteriorated thereby to lower the electromagnetic properties.

There is no specific limitation on the ferromagnetic powder used for the top surface magnetic layer (3a, 13a) for forming the magnetic recording medium of the invention. Preferred examples of the ferromagnetic powder may include: fine powders of oxides such as $\gamma\text{-Fe}_2\text{O}_3$, Co-containing $\gamma\text{-Fe}_2\text{O}_3$, $\text{Fe}_3\text{O}_4$, Co-containing $\text{Fe}_3\text{O}_4$, $\text{CrO}_2$, barium ferrite and strontium ferrite; fine powders of ferromagnetic metals and alloys such as Fe, Co, Ni, Co—Fe, Co—Fe—Ni, Co—Ni, Co—Mn, Co—Si, Co—Au and Co—Pt; and an iron carbide powder. There is no specific limitation on the particle shape of the ferromagnetic powder, as far as the shape is any of conventionally used ones such as needle shape, spindle shape, grain shape and plate shape. However, preferably used are needle shape and spindle shape, because in the case of using such shapes, higher effect of the magnetic field orientation can be expected or the strength of the magnetic layer in the longer direction can be more enhanced, as compared with the case of using the grain or plate shape.

The ferromagnetic powder preferably has a mean major axis of 0.05 to 0.6 µm and a mean axial ratio of 2 to 20, and more preferably has a mean major axis of 0.08 to 0.4 µm and a mean axial ratio of 4 to 15. If the mean major axis is too large, a bulk noise of the magnetic recording medium becomes large. On the other hand, if the mean major axis is too small, agglomeration of the ferromagnetic powder easily takes place in the magnetic paint. When a ferromagnetic metal powder is used as the ferromagnetic powder in the magnetic layer, the ferromagnetic metals (e.g., Fe, Co, Ni) or their alloys may be contained in an amount of not less than 75% by weight, preferably not less than 80% by weight.

The ferromagnetic powder has a coercivity Hc of 300 to 2,500 Oe, preferably 500 to 2,200 Oe. If the coercivity Hc is too high, recording of signals can be hardly made by a conventional magnetic head. On the other hand, the coercivity Hc is too low, reproduction output of the short wave signals cannot be sufficiently obtained. The ferromagnetic powder has saturation magnetization $\sigma_s$ of 50 to 180 emu/g, preferably 60 to 150 emu/g. If the saturation magnetization $\sigma_s$ is too small, the reproduction output is apt to lower.

Examples of the abrasive particles having a Mohs hardness of not less than 6 used for the top surface magnetic layer (3a, 13a) for constituting the paint film layer of the magnetic recording medium of the invention include particles of $TiO_2$ (Mohs hardness: 6), $SnO_2$ (Mohs hardness: 6.5), $SiO_2$ (Mohs hardness: 7), $\alpha$-$Al_2O_3$ (Mohs hardness: 9), $Cr_2O_3$ (Mohs hardness: 9), TiC (Mohs hardness: 9) and SiC (Mohs hardness: 9). These abrasives may be used singly or in combination. Among the above abrasive particles, it is preferred to use the particles of $\alpha$-$Al_2O_3$ and $Cr_2O_3$. In the invention, the particle size distribution of the abrasive particles is measured in accordance with a centrifugal precipitation measuring method, and from the centrifugal precipitation curve obtained, a particle diameter given when the amount of the particles corresponds to 50% by weight is read. The value thus obtained taken as the mean particle diameter.

Formation of the top surface magnetic layer (3a, 13a) using the ferromagnetic powder and the abrasive particles can be carried out by applying a magnetic paint containing the ferromagnetic powder and the abrasive particles dispersed in a binder onto the nonmagnetic support and drying the applied paint.

As the binder, there can be used any of thermoplastic resins, thermosetting resins, reactive resins and electron rays curing resins conventionally used and mixtures thereof.

Examples of the thermoplastic resin may include: vinyl chloride-acrylic ester copolymers, vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-ethylene copolymers, polyvinyl fluoride-vinylidene chloride-acrylonitrile copolymers, acrylonitrile-butadiene copolymers, polyamide resins, polyvinyl butyral, cellulose derivatives (e.g., cellulose acetate butyrate, cellulose diacetate, cellulose triacetate, cellulose propionate, nitrocellulose), styrene-butadiene copolymers, polyester resin-chlorovinyl ether-acrylic ester copolymers, amino resins and synthetic rubber type thermoplastic resins. These thermoplastic resins may be used singly or in combination of two or more kinds.

Among these, it is preferred to use a combination of vinyl chloride resin and polyurethane resin. Examples of the vinyl chloride resin may include a vinyl chloride resin containing sulfur (S) as a polar group, and preferred example thereof may include a vinyl chloride resin containing a sulfuric acid group and/or a sulfonic acid group. In the sulfuric acid group of —$SO_4Y$ and the sulfonic acid group of —$SO_3Y$, Y may be H or an alkali metal, but Y is preferably Na. That is, —$SO_4Na$ or —$SO_3Na$ is preferred. Any one of the sulfuric acid group and the sulfonic acid group may be contained, or both of them may be contained. If both of them are contained, the ratio therebetween is arbitrary.

The polyurethane resin may contain a S-containing polar group or a P-containing polar group. Specific examples of the S-containing polar group may include at least one of —$SO_4Y$ (sulfuric acid group) and —$SO_3Y$ (sulfonic acid group). Specific examples of the P-containing polar group may include at least one of —$PO_3Y$ (phosphonic acid group), —$PO_2Y$ (phosphinic acid group) and —POY (phosphorous acid group). Y is H or an alkali metal. Among these, it is particularly preferred to use the polar groups in which Y is Na. It is preferred that these polar groups are contained as atoms in the molecule in an amount of 0.01 to 10% by weight, particularly 0.2 to 3% by weight. They may be present in the main chain or the branch of the resin structure.

Specific examples of the thermosetting resin and the curing resin may include: phenolic resins, epoxy resins, polyurethane curing resins, urea resins, melamine resins, alkyd resins, silicone resins, acrylic type reactive resins, mixtures of high molecular weight polyester resins and isocyanate prepolymers, mixtures of methacrylate copolymers and diisocyanate prepolymers, urea-formaldehyde resins and polyamine resins. These resins may be used singly or in combination of two or more kinds.

Where the binder is used, it is preferred that a crosslinking agent is contained together in the magnetic layer. As the crosslinking agent, various kinds of polyisocyanates, particularly diisocyanates, can be used. Specific examples of the crosslinking agent may include tolylene diisocyanate, hexamethylene diisocyanate and methylene diisocyanate. These crosslinking agent may be used singly or in combination of two or more kinds. The crosslinking agent is particularly preferably used in the form of a modified crosslinking agent having plural hydroxyl groups such as trimethylolpropane or in the form of a diisocyanurate type crosslinking agent in which three molecules of a diisocyanate compound are bonded. The crosslinking agent is bonded to the functional group or the like contained in the binder resin so as to crosslink the resin. The crosslinking agent is contained in an amount of preferably 10 to 30 parts by weight based on 100 parts by weight of the resin. The thermoplastic resin as mentioned above can be cured by heating at 50° to 70° C. for 12 to 48 hours in a heating oven.

Also suitable as the binder is an electron rays curing compound. Examples of the electron rays curing compounds may include unsaturated prepolymers of maleic anhydride type, urethane(meth)acrylic type, epoxy(meth)acrylic type, polyester(meth)acrylic type, polyether(meth)acrylic type, polyurethane(meth)acrylic type and polyamide(meth)acrylic type; and polyfunctional monomers of ether(meth)acrylic type, urethane(meth)acrylic type, epoxy(meth)acrylic type, phosphoric ester(meth)acrylic type, aryl type and hydrocarbon type. These compounds may be used singly or in combination of two or more kinds.

The content of the binder in the top surface magnetic layer is in the range of usually 10 to 80 parts by weight, preferably 15 to 25 parts by weight, based on 100 parts by weight of the ferromagnetic powder. If the content thereof is too small, the strength of the magnetic layer is lowered thereby to decrease, for example, running durability. On the other hand, if the content of the binder is too large, the amount of the ferromagnetic powder is decreased thereby to deteriorate electromagnetic properties.

There is no specific limitation on a solvent used for the magnetic paint, and various solvents, e.g., ketones such as acetone, methyl ethyl ketone, methyl isobutyl ketone and cyclohexanone; aromatic hydrocarbons such as toluene, xylene and ethylbenzene; esters such as ethyl formate, ethyl acetate and butylacetate; alcohols such as methanol, ethanol, isopropanol and butanol; ethers such as isopropyl ether, ethyl ether and dioxane; furans such as tetrahydrofuran and furfral; dimethylformamide; and vinyl pyrrolidone can be used according to the purpose. The magnetic paint may further contain various additives such as inorganic fine particles, dispersants (e.g., surface active agents) and lubricants (e.g., higher fatty acids, fatty esters and silicone oil).

In the paint film layer of the magnetic recording medium of the invention, when the lower layer (3b, 13b, 13c) other than the top surface magnetic layer (3a, 13a) is a magnetic layer, this lower magnetic layer may have a constitution almost the same as that of the top surface magnetic layer (3a, 13a). The abrasive particles added to the top surface magnetic layer for the purpose of increasing the head cleaning effect or enhancing the still life may be added to the lower magnetic layer. Though the main purpose of adding a nonmagnetic inorganic powder to the lower layer is to enhance the strength of the paint film, the above-mentioned abrasive particles generally used as abrasives may be included in the lower layer. An antistatic agent such as carbon black is preferably included in the lower layer, particularly the lower paint film layer (3b, 13b) in contact with the top surface magnetic layer (3a, 13b), to prevent the magnetic recording medium from being electrostatically charged.

When the lower paint film layer includes a nonmagnetic layer, the nonmagnetic layer may have the same constitution as that of the above-mentioned lower magnetic layer except that the ferromagnetic powder is replaced with a nonmagnetic powder. As the nonmagnetic powder, various kinds of inorganic powders can be used. For example, nonmagnetic iron oxide ($\alpha$-$Fe_2O_3$) of acicular shape can be used. However, if ultrafine iron oxide of spherical shape is used, better dispersibility can be obtained, and the content of the particles in the nonmagnetic layer can be increased. Therefore, the surface properties of the nonmagnetic layer can be enhanced, whereby the surface properties of the top surface magnetic layer can be also enhanced, and the electromagnetic properties can be improved. Further, other nonmagnetic powders such as a powder of acicular-shaped $\alpha$-$Fe_2O_3$ and a powder of sphere-shaped titanium oxide disclosed in Japanese Patent Laid-Open Publications No. 191315/1988 and No. 191318/1988 can be also used. When the nonmagnetic layer is in contact with the top surface magnetic layer, an antistatic agent such as carbon black is preferably added to the nonmagnetic layer to prevent electrostatic charging of the magnetic recording medium.

A binder, a solvent, an abrasive, a lubricant, etc. used for the nonmagnetic layer may be the same as those for the lower magnetic layer described above.

There is no specific limitation on the method for forming the paint film layer, and any methods conventionally known can be used. For forming the paint film layer consisting of two or more layers including a magnetic layer on the nonmagnetic support, there can be used any of a wet-on-wet coating method in which two or more layers are coated in wet state in the superposed form and a wet-on-dry coating method in which one layer is coated on the nonmagnetic support and after drying other layer is coated thereon. However, it is preferred to use the wet-on-wet coating method because of high productivity. In this wet-on-wet coating, it is preferred that not less than 10% of the organic solvent remains in the lower layer when the upper layer is coated.

For applying the magnetic paint, any means such as gravure coating and reverse-roll coating may be used, but from the viewpoints of operating property and productivity, a method of using a die-nozzle coater is preferred.

As for the thickness of the paint film layer, the thickness of the top surface magnetic layer (3a, 13a) is not more than 0.5 μm, preferably in the range of 0.3 to 0.5 μm, as described before. The thickness of other layer(s) (lower layer (3b, 13b, 13c)) between the top surface magnetic layer (3a, 13a) and the nonmagnetic support (2, 12) can be properly determined within the range of 1.0 to 3.0 μm. If the lower layer is too thin, the layer is easily affected by the surface properties of the nonmagnetic support. As a result, surface roughness of the lower layer is deteriorated thereby to also deteriorate surface roughness of the upper layer, and hence the electromagnetic properties tend to be lowered. Moreover, since the light transmittance becomes high, a problem might occur when the tape end is detected by a change of light transmittance. On the other hand, even if the thickness of the lower layer is made larger than a certain thickness, performance of the magnetic recording medium cannot be improved particularly.

The nonmagnetic support (2, 12) for constituting the magnetic recording medium of the invention can be properly selected from films mainly containing thermoplastic polymers, nonmagnetic metal foils such as aluminum foil, ceramic sheet and paper. Specific examples of the thermoplastic polymer may include: polyester resins such as polyethylene terephthalate (PET) and polyethylene-2,6-naphthalate (PEN); cellulose resins; vinyl resins such as polyvinylchloride and polyvinylidene chloride; and thermoplastic resins such as polyamide, polyimide and polycarbonate. In addition to the thermoplastic polymers, the nonmagnetic support may further contain inorganic or organic additives such as a rust preventive and an antistatic agent and particles such as carbon black. There is no specific limitation on the thickness of the nonmagnetic support, but preferably the thickness is in the range of 4 to 75 μm.

The magnetic recording medium of the invention contains the abrasive particles in the magnetic layer of the paint film layer as described above. Hence, the magnetic layer has a high abrasion ability, and the surface of the nonmagnetic support where the paint film layer is not provided might be scratched in the running procedure of the magnetic recording medium. Therefore, as the nonmagnetic support (2, 12) for constituting the magnetic recording medium of the invention, a film containing as its major component a thermoplastic polymer which contains as inert particles at least inert particles having such basically as capable of adsorbing a basic indicator bromothymol blue with a blue color can be used. Thereby, the surface of the nonmagnetic support can be prevented from scratches caused by the addition of the abrasive particles to the magnetic layer.

Figure 3:
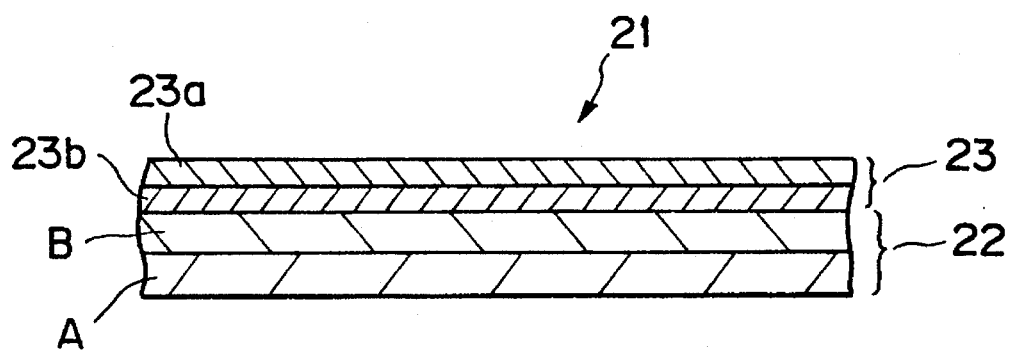
FIG. 3 is a schematic sectional view illustrating a further embodiment of the magnetic recording medium according to the present invention.

The nonmagnetic support (2, 12) for constituting the magnetic recording medium of the invention may be a biaxially oriented lamination film having a film A containing as its major component a thermoplastic polymer which contains as inert particles at least inert particles having such basicity as capable of adsorbing a basic indicator bromothymol blue with a blue color on at least one surface of a film B containing as its major component a thermoplastic polymer, and in this case, the film A is present on the surface side of the nonmagnetic support where the paint film layer is not provided. Thereby, the surface of the nonmagnetic support can be prevented from scratches, and the magnetic recording medium can be improved in the electromagnetic properties. FIG. 3 is a schematic sectional view illustrating an embodiment of such magnetic recording medium of the invention. In FIG. 3, the magnetic recording medium 21 has a paint film layer 23 of two-layer structure on a nonmagnetic support 22. The nonmagnetic support 22 consists of a film A and a film B laminated on the film A, and the paint film layer 23 is formed on the film B. The paint film layer 23 can be formed in the same manner as for the aforesaid paint film layer 3, and it may have a structure of three or more layers.

Examples of the inert particles having such basicity as capable of adsorbing a basic indicator bromothymol blue with a blue color may include particles of $\alpha$-$Al_2O_3$, $\gamma$-$Al_2O_3$ and $\theta$-$Al_2O_3$. These inert particles have a mean particle diameter of 0.05 to 0.2 μm, preferably 0.05 to 0.15 μm. If the mean particle diameter of the inert particles is less than 0.05

μm, the nonmagnetic support is not improved in the abrasion resistance. On the other hand, if the mean particle diameter thereof exceeds 0.2 μm, the abrasion resistance of the nonmagnetic support is lowered. In the case where inert particles which do not exhibit such basicity as capable of adsorbing a basic indicator bromothymol blue with a blue color are used as the inert particles, the abrasion resistance of the nonmagnetic support is not sufficiently improved. The reason why bromothymol blue is used as the basic indicator is that, in judgment whether the thermoplastic polymer has affinity for the inert particles or not, this indicator reveals a color change at proper pH and it is adsorbed by the inert particles to develop a color.

When the inert particles having such basicity as capable of adsorbing a basic indicator bromothymol blue with a blue color are contained in the whole nonmagnetic support, the content of the inert particles is preferably in the range of 0.1 to 5% by weight. When the inert particles are contained in the film A of the nonmagnetic support, the content of the inert particles in the film A is preferably in the range of 0.1 to 5% by weight.

The present invention will be further described with reference to the following examples.

Examples 1–13, Comparative examples 1–10

First, $\alpha$-$Al_2O_3$ particles (mean particle diameter: 0.1 μm), $\gamma$-$Al_2O_3$ particles (mean particle diameter: 0.1 μm), $\theta$-$Al_2O_3$ particles (mean particle diameter: 0.15 μm), $SiO_2$ particles (mean particle diameter: 0.7 μm) and $CaCO_3$ particles (mean particle diameter: 0.7 μm) were prepared as inert particles. The basicity of these inert particles was judged in the following manner. The results are set forth in Table 1 and Table 5.

[Judgment of basicity]

To 5 ml of a benzene solution, 0.1 mg of the inert particles (objects to be measured) was introduced at room temperature, and then 0.05 ml of a basic indicator bromothymol blue was dropwise added, followed by dispersing for 20 minutes by an ultrasonic dispersing machine. The resulting dispersion was allowed to stand for 24 hours, and the basicity was judged by a color of the precipitant.

From the inert particles mentioned above, combinations of inert particles set forth in Table 1 and Table 5 were selected. An ethylene glycol slurry containing the combination of the different kinds of inert particles (particle content of each kind: 0.5% by weight) was prepared. The ethylene glycol slurry was subjected to ester interchange reaction with dimethyl terephthalate, and the reaction product was subjected to polycondensation to prepare chips of polyethylene terephthalate (PET) containing the inert particles in a given amount (thermoplastic polymer A). Separately, PET substantially not containing the particles (thermoplastic polymer B) was prepared.

Subsequently, the thermoplastic polymers A and B were vacuum dried at 180° C. for 3 hours and fed to two extruders respectively. With melting at 300° C., the two kinds of the thermoplastic polymers were laminated one upon another by means of a rectangular joining block for three layers, and the resulting laminate was wound around a casting drum having a surface temperature of 30° C. by a static charge application casting method to cool and solidify the laminate. Thus, an unstretched film of three-layer structure consisting of a film layer made of the thermoplastic polymer B and film layers made of the thermoplastic polymer A formed on both surfaces of the film layer of the thermoplastic polymer B. In this co-extrusion, the discharge quantity was adjusted to control the total thickness of the unstretched film and the thickness of the film layer made of the thermoplastic polymer A.

Then, the unstretched film was stretched by 2.5 to 5.0 times in the machine direction (MD direction) at a temperature of 80° C. utilizing a difference of the peripheral speed of the roll, to give a monoaxially stretched film. Then, with heating at 100° C., the monoaxially stretched film was further stretched by 2.5 to 4.0 times in the width direction at a stretching rate of 2,000%/min by the use of a tenter, followed by heat treatment at 200° C. for 5 seconds without stretching, to obtain a biaxially oriented PET of three-layer structure (thickness of A layer: 1 μm, thickness of B layer: 13 μm) as a nonmagnetic support.

Thereafter, in order to form a magnetic layer (a print film layer), a first magnetic layer forming magnetic paint having the following composition and a second magnetic layer (top surface magnetic layer) forming magnetic paint having the following composition were prepared.

| [Composition of a first magnetic layer forming magnetic paint] | |
| --- | --- |
| Co-deposited $\gamma$-$Fe_2O_3$ (specific surface area (BET value): 25.0 $m^2/g$) | 100 parts by weight |
| Vinyl chloride tesin (MR110, available from Nippon Zeon Co., Ltd.) | 10 parts by weight |
| Polyurethane resin (N-2304, available from Nippon Polyurethane Industry Co., Ltd.) | 10 parts by weight |
| $\alpha$-$Al_2O_3$ | 3 parts by weight |
| Carbon black | 10 parts by weight |
| Fatty acid | 0.5 part by weight |
| Fatty ester | 0.5 part by weight |
| Methyl ethyl ketone | 150 parts by weight |
| Toluene | 150 parts by weight |
| Cyclohexanone | 100 parts by weight |
| Polyisocyanate (Coronate L) | 3 parts by weight |
| [Composition of a second magnetic layer forming magnetic paint] | |
| Co-deposited $\gamma$-$Fe_2O_3$ (specific surface area (BET value): 42.0 $m^2/g$) | 100 parts by weight |
| Vinyl chloride resin (MR110, available from Nippon Zeon Co., Ltd. | 10 parts by weight |
| Polyurethane resin (N-2304, available from Nippon Polyurethane Industry Co., Ltd.) | 10 parts by weight |
| $\alpha$-$Al_2O_3$ (Mohs hardness: 9, mean particle diameter: 0.55 μm) | 6 parts by weight |
| Fatty acid | 0.5 part by weight |
| Fatty ester | 0.5 part by weight |
| Methyl ethyl ketone | 150 parts by weight |
| Toluene | 150 parts by weight |
| Cyclohexanone | 100 parts by weight |
| Polyisocyanate (Coronate L) | 3 parts by weight |

The first magnetic layer forming magnetic paint of the above composition was applied onto the nonmagnetic support prepared above by an extrusion coating method with applying a magnetic field, and thereonto the second magnetic layer forming magnetic paint was applied similarly while the first magnetic layer forming magnetic paint was kept in a wet state, followed by drying, to form a magnetic layer (a print film layer) of two-layer structure on the nonmagnetic support. Then, the laminate consisting of the magnetic layer and the nonmagnetic support was calendered, thermoset and slit to have a width of ½ inch (12.7 mm), so as to prepare a magnetic recording medium.

The mean particle diameter D of $\alpha$-$Al_2O_3$ used as the abrasive particles in the second magnetic layer forming magnetic paint, the thickness T of the second magnetic layer, the ratio (D/T) of the mean particle diameter D of the $\alpha$-$Al_2O_3$ particles to the thickness T of the second magnetic layer, the content C of the $\alpha$-$Al_2O_3$ particles each having a size larger than the thickness T of the second magnetic layer in the particle size distribution of the α-Al₂O₃ particles, and the amount of the α-Al₂O₃ particles based on 100 parts by weight of the ferromagnetic powder are set forth in Table 1 and Table 5.

[Measurement of a mean particle diameter of the abrasive particles]

Using a centrifugal precipitation particle size distribution measuring apparatus SA-CP2 produced by Shimadzu Corporation, centrifugal precipitation measurement is conducted. From the obtained centrifugal precipitation curve, a particle diameter given when the quantity of the particles distributed corresponds to 50% by weight is read, and the obtained value is taken as a mean particle diameter.

[Measurement of a content C of particles having a diameter larger than a specific value in the abrasive particles]

Using a centrifugal precipitation particle size distribution measuring apparatus SA-CP2 produced by Shimadzu Corporation, centrifugal precipitation measurement is conducted. From the obtained centrifugal precipitation curve, a content of particles each having a size larger than the thickness of the second magnetic layer is read, and the obtained value is taken as a content C.

Examples 14–17

A magnetic recording medium was prepared in the same manner as described in Examples 1 to 13 except that the nonmagnetic support of three-layer structure used in Example 3 was used and Cr₂O₃ particles (Mohs hardness: 9) were used as the abrasive particles in place of the α-Al₂O₃ particles (Mohs hardness: 9). The mean particle diameter D of Cr₂O₃ used as the abrasive particles in the second magnetic layer forming magnetic paint, the thickness T of the second magnetic layer, the ratio (D/T) of the mean particle diameter D of the Cr₂O₃ particles to the thickness T of the second magnetic layer, the content C of the Cr₂O₃ particles each having a size larger than the thickness T of the second magnetic layer in the particle size distribution of the Cr₂O₃ particles, and the amount of the Cr₂O₃ particles based on 100 parts by weight of the ferromagnetic powder are set forth in Table 3.

Example 18

A magnetic recording medium was prepared in the same manner as described in Examples 1 to 13 except that the nonmagnetic support of three-layer structure used in Example 3 was used and TiO₂ particles (Mohs hardness: 6) were used as the abrasive particles in place of the α-Al₂O₃ particles (Mohs hardness: 9).

The mean particle diameter D of TiO₂ used as the abrasive particles in the second magnetic layer forming magnetic paint, the thickness T of the second magnetic layer, the ratio (D/T) of the mean particle diameter D of the TiO₂ particles to the thickness T of the second magnetic layer, the content C of the TiO₂ particles each having a size larger than the thickness T of the second magnetic layer in the particle size distribution of the TiO₂ particles, and the amount of the TiO₂ particles based on 100 parts by weight of the ferromagnetic powder are set forth in Table 3.

Examples 19–29

A magnetic recording medium was prepared in the same manner as described in Examples 1 to 13 except that the following nonmagnetic support of single-layer structure was used in place of the nonmagnetic support of three-layer structure.

The nonmagnetic support of single-layer structure was formed as follows. From the inert particles used in Examples 1 to 13, combinations of inert particles set forth in Table 3 were selected. An ethylene glycol slurry containing the combination of the different kinds of inert particles (particle content of each kind: 0.4% by weight) was prepared. The ethylene glycol slurry was subjected to ester interchange reaction with dimethyl terephthalate, and the reaction product was subjected to polycondensation to prepare chips of polyethylene terephthalate (PET) containing the inert particles in a given amount (thermoplastic polymer A).

Subsequently, this thermoplastic polymer was vacuum dried at 180° C. for 3 hours, then extruded by an extruder with melting at 300° C., and wound around a casting drum having a surface temperature of 30° C. by a static charge application casting method to cool and solidify the polymer. Thus, an unstretched film of single-layer structure was prepared. This unstretched film was stretched by 2.5 to 5.0 times in the machine direction (MD direction) at a temperature of 80° C. utilizing a difference of the peripheral speed of the roll, to give a monoaxially stretched film. Then, with heating at 100° C., the monoaxially stretched film was further stretched by 2.5 to 4.0 times in the width direction at a stretching rate of 2,000%/min by the use of a tenter, followed by heat treatment at 200° C. for 5 seconds without stretching, to obtain a biaxially oriented PET of single-layer structure (thickness: 15.0 μm) as a nonmagnetic support.

The mean particle diameter D of α-Al₂O₃ used as the abrasive particles in the second magnetic layer forming magnetic paint, the thickness T of the second magnetic layer, the ratio (D/T) of the mean particle diameter D of the α-Al₂O₃ particles to the thickness T of the second magnetic layer, the content C of the α-Al₂O₃ particles each having a size larger than the thickness T of the second magnetic layer in the particle size distribution of the α-Al₂O₃ particles, and the amount of the α-Al₂O₃ particles based on 100 parts by weight of the ferromagnetic powder are set forth in Table 3.

Example 30

A magnetic recording medium was prepared in the same manner as described in Example 3 except that the Co-deposited γ-Fe₂O₃ in the composition of the first magnetic layer forming magnetic paint was replaced with nonmagnetic iron oxide (α-Fe₂O₃).

Example 31

A magnetic recording medium was prepared in the same manner as described in Example 30 except that the nonmagnetic support of single-layer structure used in Examples 19 to 29 was used in place of the nonmagnetic support of three-layer structure used in Example 30.

Comparative Example 11

A magnetic recording medium was prepared in the same manner as described in Comparative Examples 1 to 10 except that the nonmagnetic support of three-layer structure used in Comparative Example 2 was used and CaCO₃ particles (Mohs hardness: 3) were used as the abrasive particles in place of the α-Al₂O₃ particles (Mohs hardness: 9).

The mean particle diameter D of CaCO₃ used as the abrasive particles in the second magnetic layer forming magnetic paint, the thickness T of the second magnetic layer, the ratio (D/T) of the mean particle diameter D of the CaCO₃ particles to the thickness T of the second magnetic layer, the content C of the $CaCO_3$ particles each having a size larger than the thickness T of the second magnetic layer in the particle size distribution of the $CaCO_3$ particles, and the amount of the $CaCO_3$ particles based on 100 parts by weight of the ferromagnetic powder are set forth in Table 5.

With respect to the magnetic recording media prepared above (Examples 1 to 31, Comparative Examples 1 to 11), attachment to head (durability), head clogging (durability), Y (luminance)-S/N (electromagnetic properties), C (color)-S/N (electromagnetic properties), still properties, scratches on the base surface (surface side where the magnetic layer is not formed) and scratches on the magnetic layer were measured and evaluated in the following manner. The results are set forth in Table 2, Table 4 and Table 6.

[Attachment to head]

Using video tape recorders NV-N10, NV-SX10 and AG-6200 produced by Matsushita Electric Industrial Co., Ltd. and SR-375 produced by Victor Company of Japan, Ltd., the magnetic recording medium was subjected to pass running of 50 times in three different environments (0° C., 20° C. and 60% RH, 40° C. and 80% RH). After the running, degree of dust-attachment to the magnetic head (percentage of dust-attached area in the head) of the video tape recorder was observed by a metallographic microscope (available from Nikon Co., Ltd.), and the magnetic recording medium was evaluated on the basis of the following four classes.

AA: Degree of attachment is less than 10%.

BB: Degree of attachment is not less than 10% and less than 30%.

CC: Degree of attachment is not less than 30%.

DD: Attachment to head gap is observed.

[Head clogging]

Using video tape recorders NV-FS800 produced by Matsushita Electric Industrial Co., Ltd. and TYPE 3057-PORTABLE RECORDER produced by Yokogawa Electric Works, Ltd., the following evaluation test was carried out.

Machine conditions

A head having a protrusion of 10 μm is used.

A head cleaning mechanism is unfixed from the evaluating machine.

Measuring conditions

With regard to each of the magnetic recording media (120-minute video tapes) obtained in the above examples and comparative examples, 10 volumes of the media are prepared. The video tapes of from the first volume to the tenth volume are continuously subjected to recording and reproducing, and the output fluctuation in the reproduction procedure was recorded with a pen recorder.

Evaluation

The initial output (output at the starting position of the magnetic recording medium of the first volume) is taken as a reference, and the ten volumes of the media are evaluated on the degree of output reduction on the basis of the following four classes.

AA: No output reduction takes place.

BB: Output reduction of less than −3.0 dB based on the initial output takes place.

CC: Output reduction of not less than −3.0 dB based on the initial output-takes place.

DD: Output reduction of not less than −3.0 dB based on the initial output takes place, and the reduced output does not return to the initial level.

Y-S/N

Using a noise meter UPSF2 produced by Rhode & Schwarz Co. and a video tape recorder BG7000A produced by Victor Company of Japan, Ltd., 50% white signals are recorded and reproduced to measure Y-S/N.

C-S/N

Using a noise meter UPSF2 produced by Rhode & Schwarz Co. and a video tape recorder BG7000A produced by Victor Company of Japan, Ltd., chroma signals are recorded and reproduced to measure C-S/N.

Still properties

Using a video tape recorder AG-2660 produced by Matsushita Electric Industrial Co., Ltd., a period of time at the end of which the output in the still mode is reduced to 70% at a temperature of 0° C. is measured.

Scratch on the base surface

Using a video tape recorder AG-2695 produced by Matsushita Electric Industrial Co., Ltd., FF-REW running is repeated 50 times in environment of 23° C. and 50% RH. After the running, scratches on the base surface are observed, and the magnetic recording medium is evaluated on the basis of the following four classes.

AA: Scratches are hardly observed.

BB: Few scratches are observed.

CC: Many scratches are observed.

DD: A great number of scratches are observed.

Scratch on the magnetic layer surface

Using a video tape recorder AG-2695 produced by Matsushita Electric Industrial Co., Ltd., FF-REW running is repeated 50 times in environment of 23° C. and 50% RH. After the running, scratches on the magnetic layer surface are observed, and the mantic recording medium is evaluated on the basis of the following four classes.

AA: Scratches are hardly observed.

BB: Few scratches are observed.

CC: Many scratches are observed.

DD: A great number of scratches are observed.

TABLE 1

| Magnetic recording medium | Abrasive particle Kind/ Mean particle diameter D (μm) | Thickness of the 2nd magnetic layer (μm) | D/T | Content C (%) | Amount added (wt. parts) | S | Nonmagnetic support Inert particle | Basicity —H | —OH |
|---|---|---|---|---|---|---|---|---|---|
| Ex. 1 | α-Al$_2$O$_3$ 0.44 | 0.3 | 1.47 | 87 | 6.0 | M-L | γ-Al$_2$O$_3$ SiO$_2$ | ++ | ++ |
| Ex. 2 | α-Al$_2$O$_3$ 0.44 | 0.4 | 1.10 | 65 | 6.0 | M-L | γ-Al$_2$O$_3$ SiO$_2$ | ++ | ++ |
| Ex. 3 | α-Al$_2$O$_3$ 0.40 | 0.3 | 1.33 | 70 | 6.0 | M-L | γ-Al$_2$O$_3$ CaCO$_3$ | + | ++ |
| Ex. 4 | α-Al$_2$O$_3$ 0.40 | 0.4 | 1.00 | 50 | 6.0 | M-L | γ-Al$_2$O$_3$ CaCO$_3$ | + | ++ |
| Ex. 5 | α-Al$_2$O$_3$ 0.40 | 0.4 | 1.00 | 50 | 12.0 | M-L | γAl$_2$O$_3$ CaCO$_3$ | + | ++ |
| Ex. 6 | α-Al$_2$O$_3$ 0.36 | 0.3 | 1.20 | 70 | 8.0 | M-L | γ-Al$_2$O$_3$ CaCO$_3$ | + | ++ |
| Ex. 7 | α-Al$_2$O$_3$ 0.36 | 0.3 | 1.20 | 70 | 16.0 | M-L | γ-Al$_2$O$_3$ CaCO$_3$ | + | ++ |
| Ex. 8 | α-Al$_2$O$_3$ 0.60 | 0.5 | 1.20 | 80 | 6.0 | M-L | Θ-Al$_2$O$_3$ SiO$_2$ | ++ | ++ |
| Ex. 9 | α-Al$_2$O$_3$ 0.55 | 0.5 | 1.10 | 65 | 6.0 | M-L | α-Al$_2$O$_3$ CaCO$_3$ | + | ++ |
| Ex. 10 | α-Al$_2$O$_3$ 0.50 | 0.3 | 1.67 | 71 | 6.0 | M-L | γ-A$_2$O$_3$ CaCO$_3$ | + | ++ |
| Ex. 11 | α-Al$_2$O$_3$ 0.46 | 0.3 | 1.53 | 72 | 6.0 | M-L | γAl$_2$O$_3$ CaCO$_3$ | + | ++ |
| Ex. 12 | α-Al$_2$O$_3$ 0.89 | 0.5 | 1.78 | 83 | 6.0 | M-L | γ-Al$_2$o$_3$ CaCO$_3$ | + | ++ |
| Ex. 13 | α-Al$_2$O$_3$ 0.76 | 0.5 | 1.52 | 80 | 6.0 | M-L | γAl$_2$O$_3$ CaCO$_3$ | + | ++ |

(*) S: Structure, M-L: Multi-layer

TABLE 2

| Magnetic recording medium | Evaluation of magnetic recording medium Durability A. H | H. C | Electro-magnetic Y-S/N (dB) | C-S/N (dB) | Property Still property (min) | Scratch on base surface | Scratch on magnetic layer surface |
|---|---|---|---|---|---|---|---|
| Ex. 1 | AA | AA | +3.5 | +3.3 | 100 | AA | AA |
| Ex. 2 | AA | AA | +3.8 | +3.6 | 80 | AA | AA |
| Ex. 3 | AA | AA | +3.6 | +3.5 | 100 | AA | AA |
| Ex. 4 | BB | BB | +3.8 | +3.7 | 70 | AA | AA |
| Ex. 5 | BB | BB | +3.7 | +3.5 | 70 | AA | AA |
| Ex. 6 | AA | AA | +3.7 | +3.5 | 90 | AA | AA |
| Ex. 7 | BB | BB | +3.6 | +3.3 | 90 | AA | AA |
| Ex. 8 | AA | AA | +3.6 | +3.4 | 95 | AA | AA |
| Ex. 9 | AA | AA | +3.8 | +3.6 | 85 | AA | AA |
| Ex. 10 | AA | AA | +3.5 | +3.2 | 110 | AA | AA |
| Ex. 11 | BB | AA | +3.6 | +3.3 | 100 | AA | AA |
| Ex. 12 | BB | AA | +3.4 | +3.0 | 110 | AA | AA |
| Ex. 13 | BB | AA | +3.6 | +3.2 | 110 | AA | AA |

(*) A. H: Attachment to head, H. C.: Head clogging

TABLE 3

| Magnetic recording medium | Abrasive particle Kind/ Mean particle diameter D (μm) | Thickness of the 2nd magnetic layer (μm) | D/T | Content C (%) | Amount added (wt. parts) | S | Nonmagnetic support Inert partcle | Basicity —H | —OH |
|---|---|---|---|---|---|---|---|---|---|
| Ex. 14 | Cr₂O₃ 0.43 | 0.3 | 1.43 | 71 | 6.0 | M-L | γ-Al₂O₃ CaCO₃ | + | ++ |
| Ex. 15 | Cr₂O₃ 0.43 | 0.4 | 1.08 | 53 | 4.0 | M-L | γ-Al₂O₃ CaCO₃ | + | ++ |
| Ex. 16 | Cr₂O₃ 0.56 | 0.4 | 1.40 | 70 | 6.0 | M-L | γ-Al₂O₃ CaCO₃ | + | ++ |
| Ex. 17 | Cr₂O₃ 0.56 | 0.5 | 1.12 | 57 | 6.0 | M-L | γ-Al₂O₃ CaCO₃ | + | ++ |
| Ex. 18 | TiO₂ 0.49 | 0.4 | 1.23 | 85 | 6.0 | M-L | γ-Al₂O₃ CaCO₃ | + | ++ |
| Ex. 19 | α-Al₂O₃ 0.44 | 0.3 | 1.47 | 87 | 6.0 | S-L | γ-Al₂O₃ SiO₂ | ++ | ++ |
| Ex. 20 | α-Al₂O₃ 0.44 | 0.4 | 1.10 | 65 | 6.0 | S-L | γ-Al₂O₃ SiO₂ | ++ | ++ |
| Ex. 21 | α-Al₂O₃ 0.40 | 0.3 | 1.33 | 70 | 6.0 | S-L | γ-Al₂O₃ CaCO₃ | + | + |
| Ex. 22 | α-Al₂O₃ 0.40 | 0.4 | 1.00 | 50 | 6.0 | S-L | γ-Al₂O₃ CaCO₃ | + | ++ |
| Ex. 23 | α-Al₂O₃ 0.36 | 0.3 | 1.20 | 70 | 8.0 | S-L | γ-Al₂O₃ CaCO₃ | + | ++ |
| Ex. 24 | α-Al₂O₃ 0.60 | 0.5 | 1.20 | 80 | 6.0 | S-L | θ-Al₂O₃ SiO₂ | ++ | ++ |
| Ex. 25 | α-Al₂O₃ 0.55 | 0.5 | 1.10 | 65 | 6.0 | S-L | α-Al₂O₃ CaCO₃ | + | ++ |
| Ex. 26 | α-Al₂O₃ 0.43 | 0.3 | 1.43 | 71 | 6.0 | S-L | γAl₂O₃ CaCO₃ | + | ++ |
| Ex. 27 | α-Al₂O₃ 0.43 | 0.4 | 1.08 | 53 | 4.0 | S-L | γ-Al₂O₃ CaCO₃ | + | ++ |
| Ex. 28 | α-Al₂O₃ 0.56 | 0.4 | 1.40 | 70 | 6.0 | S-L | γ-Al₂O₃ CaCO₃ | + | ++ |
| Ex. 29 | α-Al₂O₃ 0.56 | 0.5 | 1.12 | 57 | 6.0 | S-L | γ-Al₂O₃ CaCO₃ | + | ++ |
| Ex. 30 | α-Al₂O₃ 0.40 | 0.3 | 1.33 | 70 | 6.0 | M-L | γ-Al₂O₃ CaCO₃ | + | ++ |
| Ex. 31 | α-Al₂O₃ 0.40 | 0.3 | 1.33 | 70 | 6.0 | S-L | γ-Al₂O₃ CaCO₃ | + | ++ |

S: Structure, M-L: Multi-layer, S-L: Single-layer

TABLE 4

| Magnetic recording medium | Evaluation of magnetic recording medium | | | | | | |
|---|---|---|---|---|---|---|---|
| | Durability A. H 度 | H. C | Electro-magnetic property Y-S/N (dB) | C-S/N (dB) | Property Still property (min) | Scratch on base surface | Scratch on magnetic layer surface |
| Ex. 14 | AA | AA | +3.5 | +3.3 | 95 | AA | AA |
| Ex. 15 | BB | AA | +3.7 | +3.6 | 70 | AA | AA |
| Ex. 16 | AA | AA | +3.6 | +3.4 | 90 | AA | AA |
| Ex. 17 | AA | AA | +3.7 | +3.5 | 80 | AA | AA |
| Ex. 18 | BB | BB | +3.6 | +3.3 | 70 | AA | AA |
| Ex. 19 | AA | AA | +3.4 | +3.1 | 100 | AA | AA |
| Ex. 20 | AA | AA | +3.7 | +3.5 | 80 | AA | AA |
| Ex. 21 | AA | AA | +3.5 | +3.4 | 100 | AA | AA |
| Ex. 22 | BB | AA | +3.7 | +3.5 | 70 | AA | AA |
| Ex. 23 | AA | AA | +3.5 | +3.3 | 90 | AA | AA |
| Ex. 24 | AA | AA | +3.5 | +3.2 | 95 | AA | AA |
| Ex. 25 | AA | AA | +3.7 | +3.4 | 85 | AA | AA |

TABLE 4-continued

| | Evaluation of magnetic recording medium | | | | | | |
|---|---|---|---|---|---|---|---|
| Magnetic | Durability | | Electro-magnetic property | | Property Still | Scratch | Scratch on magnetic |
| recording medium | A. H 度 | H. C | Y-S/N (dB) | C-S/N (dB) | property (min) | on base surface | layer surface |
| Ex. 26 | AA | AA | +3.4 | +3.1 | 95 | AA | AA |
| Ex. 27 | BB | AA | +3.6 | +3.4 | 70 | AA | AA |
| Ex. 28 | AA | AA | +3.5 | +3.2 | 90 | AA | AA |
| Ex. 29 | AA | AA | +3.6 | +3.3 | '80 | AA | AA |
| Ex. 30 | AA | AA | +3.5 | +3.4 | 100 | AA | AA |
| Ex. 31 | AA | AA | +3.1 | +3.2 | 100 | AA | AA |

(*) A. H: Attachment to head, H. C: Head clogging

TABLE 5

| | Abrasive particle | | | | | | Nonmagnetic support | | |
|---|---|---|---|---|---|---|---|---|---|
| Magnetic recording medium | Kind/ Mean particle diameter D (μm) | Thickness of the 2nd magnetic layer (μm) | D/T | Content C (%) | Amount added (wt. parts) | S | Inert particle | Basicity —H | —OH |
| Comp. Ex. 1 | α-Al$_2$O$_3$ 0.40 | 0.2 | 2.00 | 94 | 6.0 | M-L | γ-Al$_2$O$_3$ SiO$_2$ | ++ | ++ |
| Comp. Ex. 2 | α-Al$_2$O$_3$ 0.36 | 0.2 | 1.80 | 95 | 6.0 | M-L | γ-Al$_2$O$_3$ CaCO$_3$ | + | ++ |
| Comp. Ex. 3 | α-Al$_2$O$_3$ 0.55 | 0.4 | 1.38 | 93 | 6.0 | M-L | γ-Al$_2$O$_3$ CaCO$_3$ | + | ++ |
| Comp. Ex. 4 | α-Al$_2$O$_3$ 0.36 | 0.4 | 0.90 | 40 | 6.0 | M-L | γ-Al$_2$O$_3$ CaCO$_3$ | + | ++ |
| Comp. Ex. 5 | α-Al$_2$O$_3$ 0.44 | 0.5 | 0.88 | 34 | 6.0 | M-L | γ-Al$_2$O$_3$ CaCO$_3$ | + | ++ |
| Comp. Ex. 6 | α-Al$_2$O$_3$ 0.20 | 0.4 | 0.50 | 5 | 6.0 | M-L | γ-Al$_2$O$_3$ CaCO$_3$ | ++ + | |
| Comp. Ex. 7 | α-Al$_2$O$_3$ 0.55 | 0.6 | 0.92 | 35 | 6.0 | M-L | γ-Al$_2$O$_3$ CaCO$_3$ | + | ++ |
| Comp. Ex. 8 | α-Al$_2$O$_3$ 0.60 | 0.7 | 0.86 | 28 | 6.0 | M-L | γ-Al$_2$O$_3$ CaCO$_3$ | + | ++ |
| Comp. Ex. 9 | α-Al$_2$O$_3$ 0.40 | 0.3 | 1.33 | 70 | 1.5 | M-L | γ-Al$_2$O$_3$ CaCO$_3$ | + | ++ |
| Comp. Ex. 10 | α-Al$_2$O$_3$ 0.56 | 0.4 | 1.40 | 70 | 20.0 | M-L | γ-Al$_2$O$_3$ CaCO$_3$ | ++ + | |
| Comp. Ex. 11 | CaCO$_3$ 0.58 | 0.4 | 1.45 | 70 | 60 | M-L | γ-Al$_3$O$_3$ CaCO$_3$ | + | ++ |

(*) S: Structure, M-L: Multi-layer

TABLE 6

| Magnetic recording medium | magnetic Durability | | Electro-magnetic property | | Property Still | Scratch | Scratch on magnetic |
|---|---|---|---|---|---|---|---|
| | A. H | H. C | Y-S/N (dB) | C-S/N (dB) | property (min) | on base surface | layer surface |
| Comp. Ex. 1 | CC | CC | +2.8 | +2.5 | 85 | AA | DD |
| Comp. Ex. 2 | CC | CC | +2.9 | +2.5 | 90 | AA | CC |
| Comp. Ex. 3 | CC | CC | +3.0 | +2.8 | 90 | AA | AA |
| Comp. Ex. 4 | CC | DD | +3.7 | +3.6 | 40 | AA | CC |

TABLE 6-continued

| Magnetic recording medium | magnetic Durability A. H | H. C | Electro-magnetic property Y-S/N (dB) | C-S/N (dB) | Property Still property (min) | Scratch on base surface | Scratch on magnetic layer surface |
|---|---|---|---|---|---|---|---|
| Comp. Ex. 5 | DD | DD | +3.8 | +3.6 | 30 | AA | CC |
| Comp. Ex. 6 | DD | DD | +3.9 | +3.7 | 15 | AA | CC |
| Comp. Ex. 7 | CC | DD | +3.8 | +3.6 | 20 | AA | CC |
| Comp. Ex. 8 | DD | DD | +3.9 | +3.7 | 20 | AA | CC |
| Comp. Ex. 9 | DD | DD | +3.7 | +3.6 | 35 | AA | AA |
| Comp. Ex. 10 | CC | CC | +2.7 | +2.4 | 90 | AA | AA |
| Comp. Ex. 11 | DD | DD | +3.4 | +3.2 | 10 | AA | AA |

As is evident from the results set forth in Table 1 to Table 6, the magnetic recording media of the invention (Examples 1 to 31) are remarkably small in the attachment to head and the head clogging, and hence they have excellent running durability. In addition, they are on high levels in the electromagnetic properties (Y-S/N, C-S/N) and the still properties. Moreover, occurrence of scratches on both the base surface and the magnetic layer surface is markedly low.

As the present invention may be embodied in various forms without departing from the spirit or the essential characteristics thereof, the above-mentioned examples are therefore illustrative and not restrictive. The scope of the invention is defined by the appended claims rather than by the description preceding them, and all changes that fall within bounds of the claims or equivalences of such bounds are therefore intended to be embraced by the claims.

What is claimed is:

1. A magnetic recording medium comprising a nonmagnetic support having thereon a paint film layer including a magnetic layer, wherein the paint film layer has a lamination structure consisting of two or more layers, a top surface layer of the layers constituting the paint film layer is the magnetic layer, the top surface magnetic layer contains abrasive particles having a Mohs hardness of not less than 6 in an amount of 3 to 16 parts by weight based on 100 parts by weight of a ferromagnetic powder and has a thickness of not more than 0.5 μm, a ratio of a mean particle diameter of the abrasive particles to the thickness of the top surface magnetic layer is in the range of 1.08 to 1.8, and a content of the abrasive particles each having a size larger than the thickness of the top surface magnetic layer in the particle size distribution of the abrasive particles is in the range of 50 to 90% by weight, and the nonmagnetic support comprises a biaxially oriented polyethylene terephthalate film containing as inert particles at least inert particles having such basicity as capable of adsorbing a basic indicator bromothymol blue with a blue color, and said magnetic recording medium is a tape.

2. The magnetic recording medium as claimed in claim 1, wherein the ferromagnetic powder is a ferromagnetic powder having a mean major axis of 0.05 to 0.6 μm and a mean axial ratio of 2 to 20.

3. The magnetic recording medium as claimed in claim 1, wherein the ferromagnetic powder is a ferromagnetic powder having a coercivity of 300 to 2,500 Oe.

4. The magnetic recording medium as claimed in claim 1, wherein the ferromagnetic powder is a ferromagnetic powder having saturation magnetization $\sigma_s$ of 50 to 180 emu/g.

5. The magnetic recording medium as claimed in claim 1, wherein the abrasive particles are particles of at least one of $\alpha$-$Al_2O_3$ and $Cr_2O_3$.

6. The magnetic recording medium as claimed in claim 1, wherein a lower paint film layer in contact with the top surface magnetic layer contains an antistatic agent.

7. The magnetic recording medium as claimed in claim 1, wherein the paint film layer is formed by means of wet-on-wet coating.

8. The magnetic recording medium as claimed in claim 1, wherein the inert particles are inert particles having a mean particle diameter of 0.05 to 0.2 μm.

9. The magnetic recording medium as claimed in claim 1, wherein the inert particles are contained in the nonmagnetic support in an amount of 0.1 to 5% by weight.

10. A magnetic recording medium comprising a nonmagnetic support having thereon a paint film layer including a magnetic layer, wherein the paint film layer has a lamination structure consisting of two or more layers, a top surface layer of the layers constituting the paint film layer is the magnetic layer, the top surface magnetic layer contains abrasive particles having a Mohs hardness of not less than 6 in an amount of 3 to 16 parts by weight based on 100 parts by weight of a ferromagnetic powder and has a thickness of not more than 0.5 μm, a ratio of a mean particle diameter of the abrasive particles to the thickness of the top surface magnetic layer is in the range of 1.08 to 1.8, and a content of the abrasive particles each having a size larger than the thickness of the top surface magnetic layer in the particle size distribution of the abrasive particles is in the range of 50 to 90% by weight, and the nonmagnetic support comprises a biaxially oriented polyethylene terephthalate lamination film having a film A, containing as inert particles at least inert particles having such basicity as capable of adsorbing a basic indicator bromothymol blue with a blue color, on at least one surface of a film B, containing as its major component a thermoplastic polymer, and the film A is present on the surface side of the nonmagnetic support where the paint film layer is not formed, and said magnetic recording medium is a tape.

11. The magnetic recording medium as claimed in claim 10, wherein the inert particles are inert particles having a mean particle diameter of 0.05 to 0.2 μm.

12. The magnetic recording medium as claimed in claim 10, wherein the inert particles are contained in the film A of the nonmagnetic support in an amount of 0.1 to 5% by weight.

13. The magnetic recording medium as claimed in claim 10, wherein the ferromagnetic powder is a ferromagnetic powder having a mean major axis of 0.05 to 0.6 μm and a mean axial ratio of 2 to 20.

14. The magnetic recording medium as claimed in claim 10, wherein the ferromagnetic powder is a ferromagnetic powder having a coercivity of 300 to 2,500 Oe.

15. The magnetic recording medium as claimed in claim 10, wherein the ferromagnetic powder is a ferromagnetic powder having saturation magnetization $\sigma_s$ of 50 to 180 emu/g.

16. The magnetic recording medium as claimed in claim 10, wherein the abrasive particles are particles of at least one of $\alpha\text{-}Al_2O_3$ and $Cr_2O_3$.

17. The magnetic recording medium as claimed in claim 10, wherein a lower paint film layer in contact with the top surface magnetic layer contains an antistatic agent.

18. The magnetic recording medium as claimed in claim 10, wherein the paint film layer is formed by means of wet-on-wet coating.

* * * * *